United States Patent
Miller et al.

(10) Patent No.: US 9,941,831 B1
(45) Date of Patent: Apr. 10, 2018

(54) SWITCHED RELUCTANCE MOTOR POWER ESTIMATION COMPENSATION FOR VARIABLE DC-LINK VOLTAGE

(71) Applicant: Caterpillar Inc., Peoria, IL (US)

(72) Inventors: Jason L. Miller, Princeville, IL (US); Ernesto Inoa, Glendora, CA (US); Jesse Gerdes, Dunlap, IL (US); Alexander C. Crosman, III, Dunlap, IL (US); Carlos E. Nino-Baron, Edwards, IL (US); Thomas Michael Sopko, Jr., East Peoria, IL (US); Jackson Wai, Dunlap, IL (US); Ahmed Khalil, Dunlap, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 15/618,184

(22) Filed: Jun. 9, 2017

(51) Int. Cl.
 *H02P 25/08* (2016.01)
 *H02P 6/08* (2016.01)
 *E02F 9/20* (2006.01)

(52) U.S. Cl.
 CPC ............ *H02P 25/08* (2013.01); *H02P 6/08* (2013.01); *E02F 9/207* (2013.01); *H02P 2203/01* (2013.01)

(58) Field of Classification Search
 CPC ........ H02P 25/08; H02P 6/08; H02P 2203/01; E02F 9/207
 USPC ..................................................... 318/254.1
 See application file for complete search history.

(56) References Cited

U.S. PATENT DOCUMENTS

| | | | |
|---|---|---|---|
| 6,756,757 B2 | 6/2004 | Joseph et al. | |
| 7,332,837 B2 * | 2/2008 | Ward | H02K 1/182 310/54 |
| 7,592,766 B2 * | 9/2009 | Patel | B60K 6/26 318/400.02 |
| 7,746,024 B2 * | 6/2010 | Rozman | H02M 1/12 318/722 |
| 8,080,969 B2 * | 12/2011 | Koenig | H02P 25/08 318/432 |
| 8,744,794 B2 * | 6/2014 | Wu | H02P 21/22 318/400.07 |
| 8,836,256 B2 * | 9/2014 | Vilar | H02P 23/14 180/65.1 |
| 8,901,869 B2 * | 12/2014 | Wai | H02P 25/0805 318/432 |
| 9,065,379 B2 | 6/2015 | Tabata et al. | |
| 9,174,525 B2 * | 11/2015 | Caron | B60L 11/005 |
| 9,252,697 B2 | 2/2016 | Ahmad | |

(Continued)

*Primary Examiner* — Rita Leykin
(74) *Attorney, Agent, or Firm* — James S. Bennin

(57) ABSTRACT

A control system for a switched reluctance (SR) motor includes a Direct Current (DC) power source, and an inverter. The control system includes a user interface configured to enable an operator to specify a desired torque output. The control system further includes a controller which converts a DC current from the Alternating Current (AC) supplied to the SR motor by the inverter. The controller estimates an actual power output generated by the SR motor based on a DC voltage supplied by the DC power source to the inverter, and the converted DC current. The controller estimates an actual torque output based on the actual power output and a rotational speed of the SR motor. The controller compares the actual torque output and a desired torque output to calculate a torque error. The controller adjusts a torque output limit and the rotational speed of the SR motor.

20 Claims, 3 Drawing Sheets

(56) References Cited

U.S. PATENT DOCUMENTS

| | | | |
|---|---|---|---|
| 9,369,079 B2* | 6/2016 | Fu | H02P 29/02 |
| 9,391,555 B2* | 7/2016 | Wai | H02P 25/086 |
| 9,450,522 B2 | 9/2016 | Tsuda et al. | |
| 9,688,154 B2* | 6/2017 | Nakamura | B60L 11/1803 |
| 2004/0257011 A1* | 12/2004 | Rechberger | H02P 9/00 |
| | | | 318/139 |
| 2007/0120520 A1* | 5/2007 | Miyazaki | B60L 11/123 |
| | | | 318/801 |
| 2010/0076612 A1* | 3/2010 | Robertson | H02M 5/4505 |
| | | | 700/286 |
| 2016/0052383 A1* | 2/2016 | Caron | B60L 11/005 |
| | | | 180/242 |
| 2016/0116354 A1 | 4/2016 | Grashof | |

* cited by examiner

US 9,941,831 B1

SWITCHED RELUCTANCE MOTOR POWER ESTIMATION COMPENSATION FOR VARIABLE DC-LINK VOLTAGE

TECHNICAL FIELD

The present disclosure relates to a switched reluctance motor. More specifically, the present disclosure relates to a control system for the switched reluctance motor.

BACKGROUND

Electrical drivetrain for work machine, such as a track type tractor, may typically include an engine (e.g., internal combustion engine), a generator coupled to the engine, a Direct Current (DC) power source and a motor. The DC power source may be coupled electrically between the generator and the motor to drive one or more ground engaging elements of the machine. A converter may be coupled electrically between the generator and the DC power source. The converter may be controlled to convert Alternating Current (AC) power to DC power when the generator generates power, and DC power to AC power when the generator utilizes power to drive the motor. An inverter may be coupled electrically between the DC power source and the motor. The inverter may be configured to convert DC power from the DC power source to AC power when the generator utilizes power to drive the motor and to convert AC power to DC power during electrical braking of the motor.

The motor may be a switched reluctance (SR) motor. Traditionally, the SR motor has been controlled using open-loop table-based control. However, this type of control cannot compensate for the dynamic variants in the system, such as the DC-link voltage or phase currents of the phases of the SR motor. This is due to the fact that control tables are tuned or calculated as a function of test stand setup at a fixed DC-link voltage. If, in practice, the DC-link voltage departs from that voltage, or the actual phase current has drifted from the commanded phase current, the actual torque generated by the SR motor may deviate substantially from a requested torque.

In order to account for variations in the DC-link voltage, control maps developed off-line should include an axis for the DC-link voltage. This requirement increases required memory space at a rate proportional to number of voltages points considered, besides needing a higher-dimensional interpolation algorithm in order to account for the extra dimension. A higher DC-link voltage decreases the reliability and/or accuracy of an initial position algorithm of the SR motor. Due to lower accuracy of the initial position algorithm, the risk of lower torque accuracy increases even further. Also, part-to-part variations in the SR motor manufacturing increases risk of torque accuracy error. Torque tuning process is costly and time consuming, but currently needed every time a new design is implemented. On a SR motor where speed is controlled to a speed target, adjusting torque output directly based on an algorithm can make tuning the speed control difficult. Further, if the torque limit is set too high, damage to mechanical and electrical components can occur. On the other hand, if the torque limit is set too low, motor performance is degraded Thus, an improved control means for the SR motor is required.

SUMMARY

In an aspect of the present disclosure, a control system for a switched reluctance (SR) motor is provided. The control system includes a Direct Current (DC) power source, and an inverter coupled to the DC power source at an input side of the inverter. The inverter is coupled to the SR motor on an output side of the inverter. The inverter receives DC voltage from the DC power source, and supplies Alternating Current (AC) to the SR motor. The control system includes a user interface which enables an operator to specify a desired torque output. The user interface generates signals indicative of the desired torque output. The control system further includes a controller in communication with the SR motor, the DC power source, the inverter, the speed sensor, and the user interface. The controller determines a DC current by converting the AC current supplied to the SR motor by the inverter. The controller estimates an actual power output generated by the SR motor based at least on the DC voltage and the converted DC current. The controller determines a rotational speed of the SR motor. The controller estimates an actual torque output based on the actual power output and the speed of the SR motor. The controller receives the signals indicative of the desired torque output from the user interface. The controller compares the actual torque output and the desired torque output to calculate a torque error. Further, the controller adjusts a torque output limit based on the torque error, and adjusts the rotational speed of the SR motor based on the torque output limit.

In another aspect of the present disclosure, a switched reluctance drive is provided. The switched reluctance drive includes a stator, and a rotor configured to rotate inside the stator. The switched reluctance drive includes a Direct Current (DC) power source, and an inverter coupled to the DC power source towards an input side of the inverter. The inverter is coupled to the SR motor towards an output side of the inverter. The inverter receives DC voltage from the DC power source, and supplies Alternating Current (AC) to the SR motor. The switched reluctance drive includes a user interface which enables an operator to provide a desired torque output. The user interface generates signals indicative of the desired torque output. The switched reluctance drive further includes a controller in communication with the SR motor, the inverter, the speed sensor, and the user interface. The controller determines a DC current by converting the AC current supplied to the SR motor by the inverter. The controller estimates an actual power output generated by the SR motor based at least on the DC voltage and the converted DC current. The controller determines a rotational speed of the SR motor. The controller estimates an actual torque output based on the actual power output and the rotational speed of the SR motor. The controller receives the signals indicative of the desired torque output from the user interface. The controller compares the actual torque output and the desired torque output to calculate a torque error. Further, the controller adjusts a torque output limit based on the torque error, and adjusts the actual torque output of the SR motor based on the torque output limit.

In yet another aspect of the present disclosure, a method of controlling a switched reluctance (SR) motor is provided. The method includes determining a Direct Current (DC) by converting an Alternating Current (AC) by a controller. The AC current is supplied to the SR motor by an inverter. The method includes estimating an actual power output generated by the SR motor by the controller, based at least on the converted DC current and a DC voltage. The DC voltage is supplied to the inverter by a DC power source. The method includes determining a rotational speed of the SR motor by the controller. The method includes estimating an actual torque output by the controller based on the actual power output and the rotational speed of the SR motor. The method includes receiving signals indicative of the desired torque output by the controller from a user interface. The method includes comparing the actual torque output and the desired torque output by the controller to calculate a torque error. The method includes adjusting a torque output limit by the controller. The method further includes adjusting the rotational speed of the SR motor based on the torque output limit by the controller.

DETAILED DESCRIPTION

Figure 1:
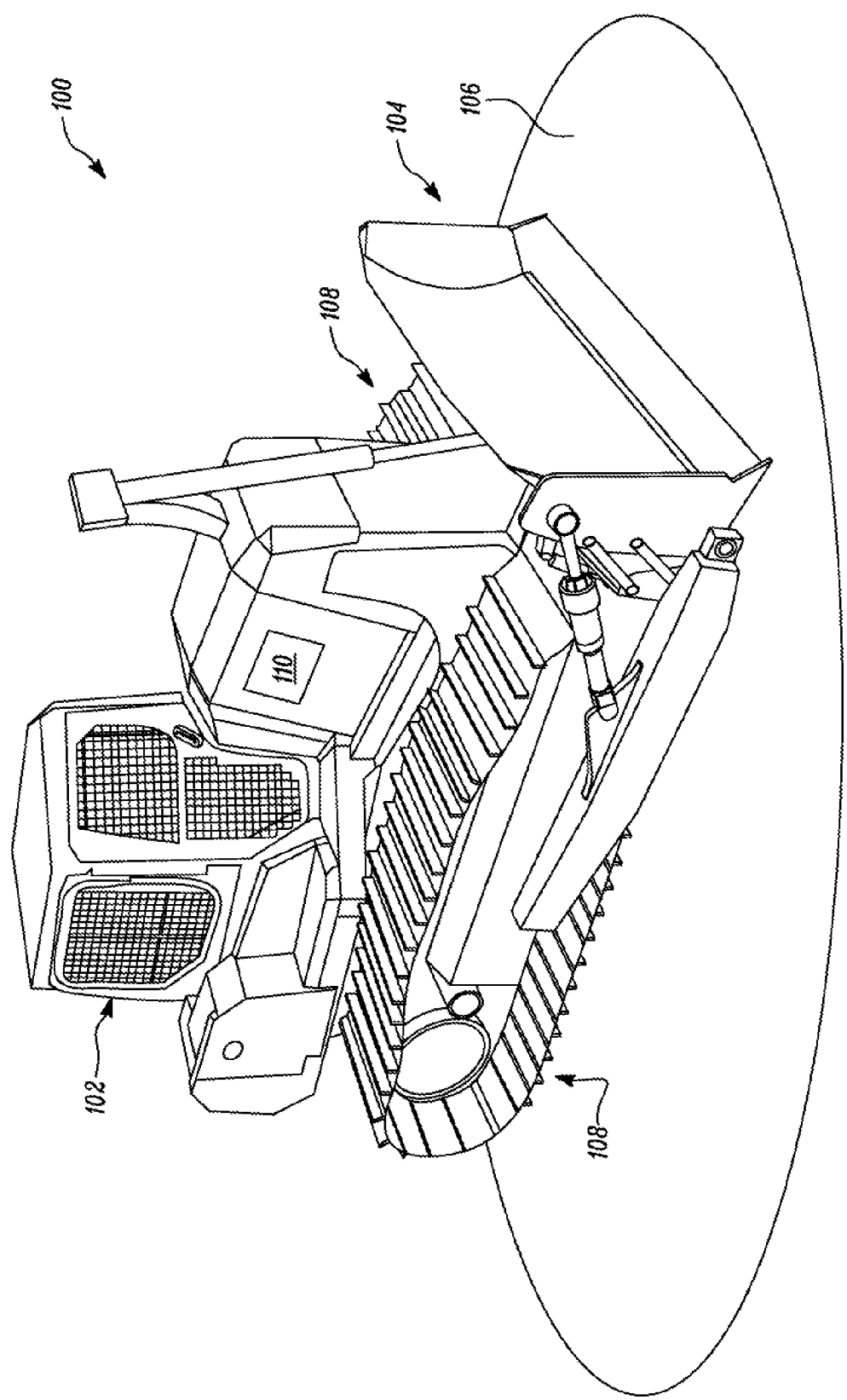
FIG. 1 is an exemplary machine illustrated as a track type tractor, in accordance with an embodiment of the present disclosure.

Wherever possible, the same reference numbers will be used throughout the drawings to refer to same or like parts. FIG. 1 illustrates an exemplary machine 100. The machine 100 may be a mobile machine that performs operations associated with industries such as mining, construction, farming, transportation, landscaping, or the like. For example, the machine 100 may be a track type tractor or dozer, as depicted in FIG. 1, a motor grader, or any other earth-moving machine known in the art. While the following detailed description describes an exemplary aspect in connection with a track type tractor, it should be appreciated that the description applies equally to the use of the present disclosure in other machines.

As shown, the machine 100 includes an operator's station or cab 102. The cab 102 may include a user interface (not shown) to operate the machine 100. The user interface may be provided along with or may include, for example, one or more displays. The user interface may be configured to propel the machine 100 and/or to control other machine components. In some embodiments, the user interface may be an accelerator pedal, or a digital interface which may enable an operator to provide a desired torque command to operate the machine 100. The user interface may also include one or more joysticks provided within the cab 102, and adapted to receive an input from an operator indicative of a desired movement of the machine 100. The display may convey information to the operator and may include a keyboard, touch screen, or any suitable mechanism for receiving input from the operator to control and/or operate the machine 100, and/or the other machine components.

The machine 100 further includes an implement system 104. The implement system 104 may be adapted to engage, penetrate, or cut a ground surface 106 of a worksite and may be further adapted to move the earth to accomplish a predetermined task. The worksite may include, for example, a mine site, a landfill, a quarry, a construction site, a golf course, or any other type of worksite. The machine 100 further includes ground engaging elements 108 for propelling the machine 100 in a forward or a backward direction on the ground surface 106. In the illustrated embodiment, the ground engaging elements 108 are shown as continuous tracks. In some embodiments, the ground engaging elements 108 may also be embodied as wheels. The desired torque command provided by the operator through the user interface may be a required torque for operating the implement system 104, a required torque for propelling the machine 100 through the ground engaging elements 108, or a combination the two based on the application requirements.

The machine 100 includes an engine 110 for providing power for various purposes such as propelling the machine 100, operating the implement system 104 etc. The engine 110 may be an internal combustion engine, for example, a petrol engine, a diesel engine, or a gas-powered engine. The engine 110 provides power to the implement system 104 and/or ground engaging elements 108 through a switched reluctance drive. Various components as well as operational aspects of the switched reluctance drive are explained with the help of FIG. 2.

Figure 2:
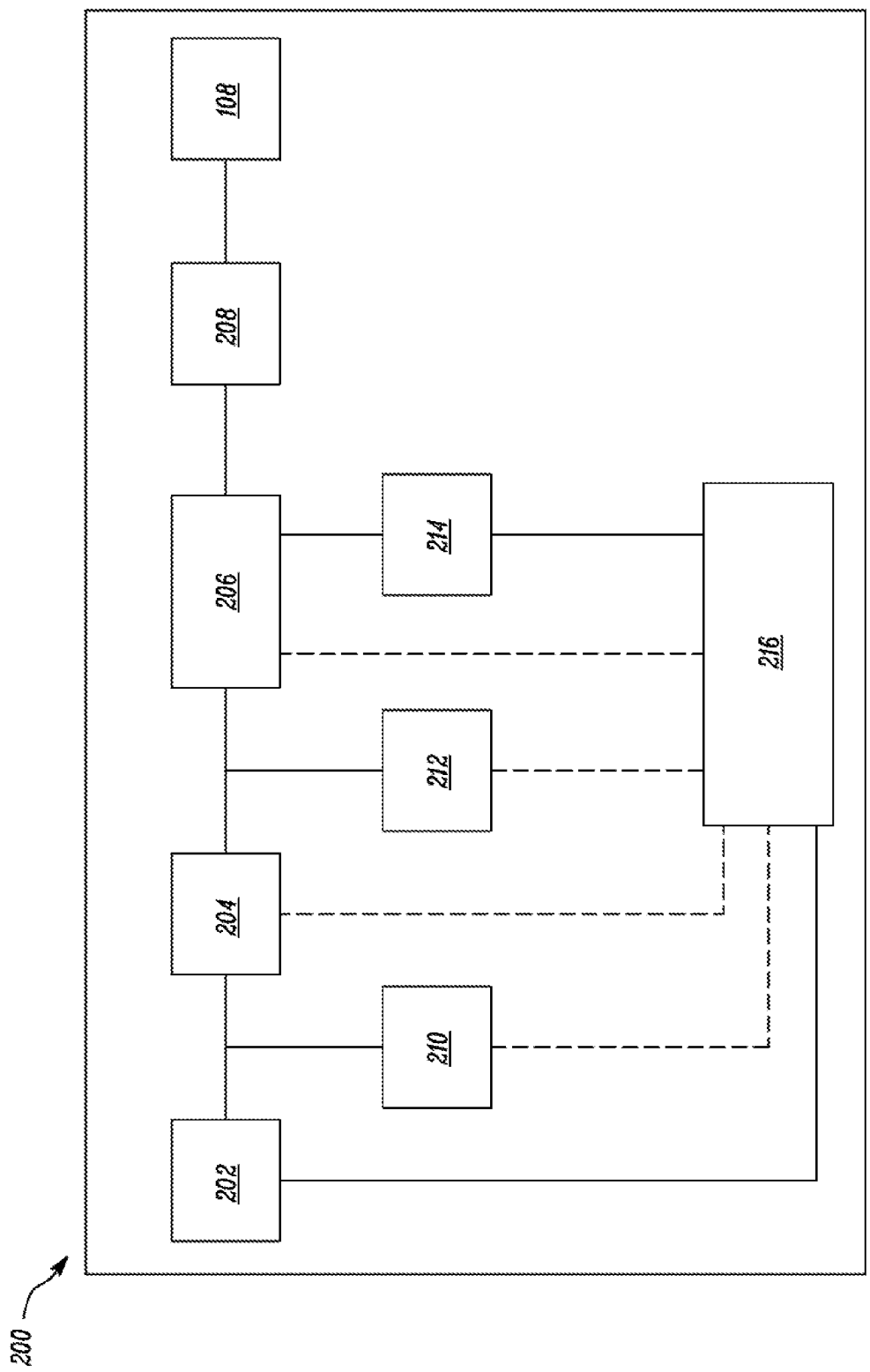
FIG. 2 is a block diagram schematically representing a control system for the machine of FIG. 1, in accordance with an embodiment of the present disclosure.
Figure 3:
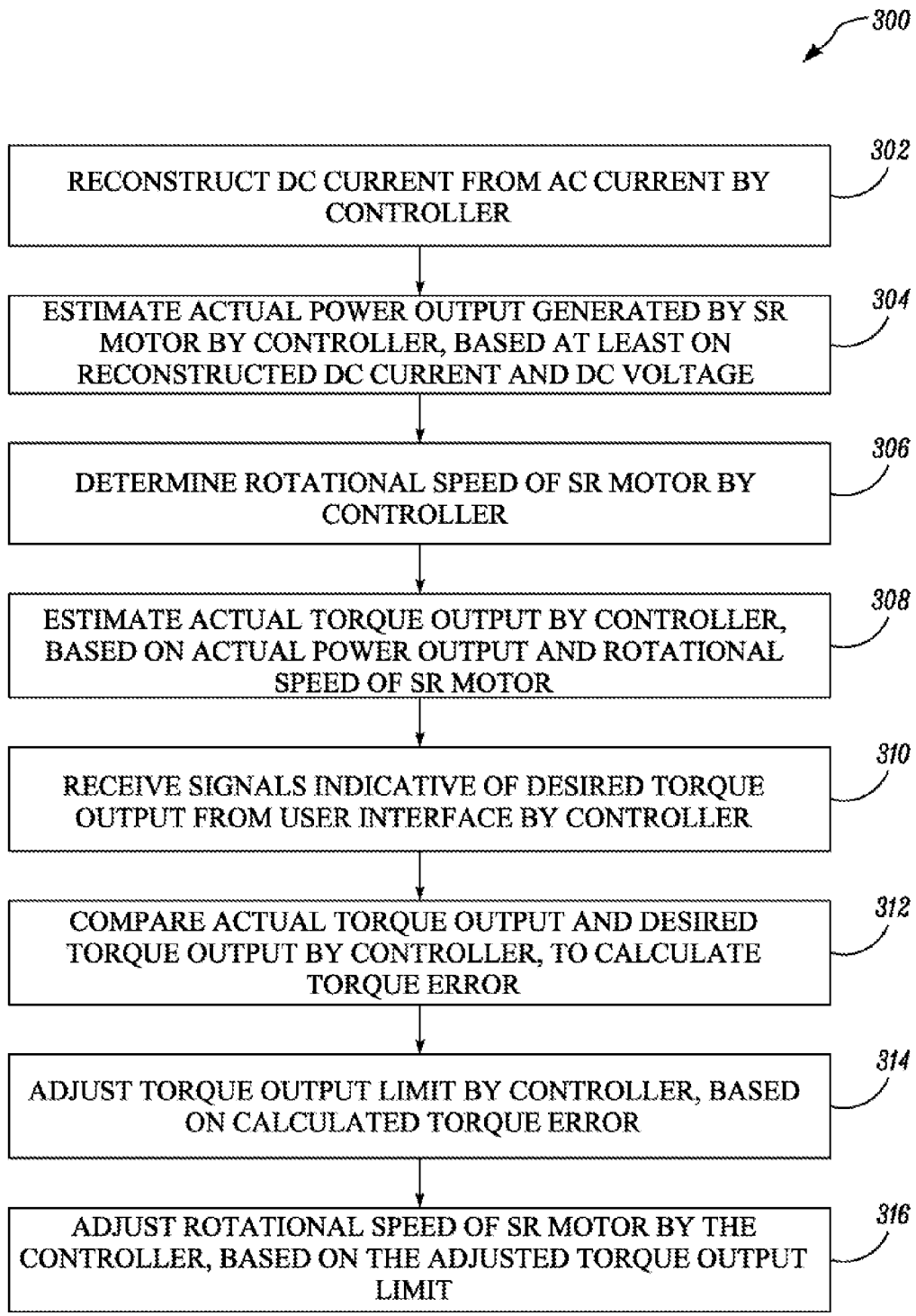
FIG. 3 is a flow chart showing a method of controlling the machine of FIG. 1, in accordance with an embodiment of the present disclosure.

FIG. 2 illustrates a control system 200 for the switched reluctance drive of the machine 100. The control system 200 includes a DC power source 202 which may be coupled to the engine 110. The engine 110 may supply power to the DC power source 202 through a generator (not shown). The engine 110 generates mechanical power and supplies the mechanical power to the generator. The generator converts the mechanical power to electrical power and supplies the DC power source 202 with the electrical power. A converter (not shown) may be provided between the generator and the DC power source 202 for converting the electrical power from the generator to DC power for supplying to the DC power source 202. The control system 200 further includes an inverter 204. The inverter 204 has an input side and an output side. The inverter 204 is coupled to the DC power source 202 towards the input side of the inverter 204 such that the inverter 204 receives DC power from the DC power source 202. The inverter 204 is coupled to a Switched Reluctance (SR) motor 206 towards the output side of the inverter 204. The inverter 204 receives the DC power from the DC power source 202, and supplies AC power to the SR motor 206.

The SR motor 206 includes a rotor which rotates inside a stator of the SR motor 206. The SR motor 206 is configured to convert electrical energy to mechanical energy (in a motoring mode), or to convert mechanical energy to electrical energy (in a braking mode). In the motoring mode, the SR motor 206 is operable to receive electrical energy from the inverter 204 and convert it to mechanical energy. In the braking mode, the SR motor 206 is operable to convert mechanical energy to electrical energy for supplying to the inverter 204 thereby braking (i.e., slowing down) a rotational speed of the SR motor 206 and thus a speed of the machine 100. The SR motor 206 may be further coupled to a final drive 208 of the machine 100. The SR motor 206 may be configured to provide torque output to the final drive 208 which may be further distributed to the ground engaging elements 108 by the final drive 208 as per application requirements.

In some embodiments, the SR motor 206 may be provided with limits on the torque output based on application requirements. The limits may include a maximum torque output value and a minimum torque output value. The maximum and the minimum torque output values define a range of torque output which may be provided by the SR motor 206 to the final drive 208. The torque output limits may depend on various factors such as, but not limited to, operational condition of the SR motor 206 such as a wear status of the rotor and the stator, characteristic properties of the SR motor 206 such as a number of poles of a rotor, a size of a stator and the rotor, magnetization curves etc. The torque output limit may also depend on an application area for which the machine 100 is being used such as excavating, grading etc., machine specifications, and SR motor efficiency, and operational characteristics of other components of the switched reluctance drive such as inverter efficiency, maximum energy storage capacity of the DC power source, etc. In this manner, the power generated by the engine 110 is provided to the ground engaging elements 108 through the switched reluctance drive.

The control system 200 includes a voltage sensor 210 coupled to the DC power source 202. The voltage sensor 210 measures a DC voltage being provided by the DC power source 202 to the inverter 204. The DC voltage provided by the DC power source 202 to the inverter 204 may also be known as a DC-link voltage. The voltage sensor 210 may be any type of a voltage sensor which may be configured to measure the DC voltage being supplied by the DC power source 202 to the inverter 204. The voltage sensor 210 generates signals indicative of the measured DC voltage. The control system 200 also includes a current sensor 212 coupled to the inverter 204. The current sensor 212 measures the AC current being supplied by the inverter 204 to the SR motor 206. The current sensor 212 may be any type of a current sensor which may measure the AC current being supplied by the inverter 204 to the SR motor 206. In some embodiments, the SR motor 206 is embodied as a three phase motor. In such a case, the current sensor 212 is coupled electrically to one the three phases of the SR motor 206 to sense a phase current of that phase and output a phase current signal indicative of that phase current.

The control system 200 further includes a speed estimation module 214. The speed estimation module 214 may be a single or multiple microprocessor, or a microcontroller, or any other such type of component which may perform necessary calculations to estimate a rotational speed of the SR motor 206. The speed estimation module 214 may estimates the rotational speed of the SR motor 206 based on various parameters such as the characteristic properties of the SR motor 206, position of the rotor etc. In some embodiments, the rotational speed of the SR motor 206 may be determined by a speed sensor coupled to the SR motor 206. The speed sensor may measure the rotational speed of the SR motor 206. More specifically, the speed sensor may measure the rotational speed of the rotor inside the stator of the SR motor 206. The speed sensor may be any type of a speed sensor which may accurately measure the rotational speed of the SR motor 206. The speed sensor may generate signals indicative of the measured rotational speed of the SR motor 206.

The control system 200 further includes a controller 216. The controller 216 may be implemented using one or more of a processor, a microprocessor, a microcontroller, a digital signal processor (DSP), a field-programmable gate array (FPGA), an electronic control module ECM, an electronic control unit ECU, or any other suitable means for electronically controlling functionality of the control system 200. The controller 216 may be configured to operate according to a predetermined algorithm or set of instructions for operating the switched reluctance drive based on the rotational speed and/or position of the rotor relative to the stator and other operating characteristics of the electric drive. Such an algorithm or set of instructions may be preprogrammed or incorporated into a memory that is accessible to and/or disposed within the controller 216 as is commonly known in the art. For example, the controller 216 may determine an initial position of the rotor relative to the stator when the SR motor 206 starts operation. The controller 216 may then control the operation of the SR motor 206 based on the initial rotor position. It should be contemplated that the controller 216 may control the operation of the switched reluctance drive based on various parameters, and the example of initial rotor position does not limit the scope of the present disclosure in any manner.

The controller 216 is communicably coupled to the DC power source 202, the inverter 204, and the SR motor 206. The controller 216 is also in communication with the voltage sensor 210, the current sensor 212, and the speed estimation module 214. The controller 216 receives the signals generated by the voltage sensor 210 indicative of the DC voltage provided to the inverter 204 by the DC power source 202. The controller 216 receives the signals generated by the current sensor 212 indicative of the AC current supplied by the inverter 204 to the SR motor 206. The controller 216 also receives the rotational speed of the SR motor by the speed estimation module 214. In some embodiments, the controller 216 receives the signals indicative of the rotational speed of the SR motor 206 from the speed sensor.

After receiving the signals generated by the current sensor 212 indicative of the AC current supplied by the inverter 204 to the SR motor 206, the controller 216 converts a DC current from the AC current. The controller 216 may convert the DC current from the AC current based on any conventional methods or algorithms already known in the art, which may be suitable as per application requirements. Further, the present disclosure, in any manner is not restricted to the method or algorithm being used for conversion of the DC current.

The controller 216 then estimates an actual power output of the SR motor 206 based on the converted DC current, and the DC voltage supplied by the DC power source 202 to the inverter 204. The controller 216 receives the signals indicative of the DC voltage from the voltage sensor 210. In some embodiments, as the controller 216 is in communication with the DC power source 202, the controller 216 may have information about charge status of the DC power source 202, and the controller 216 may determine the DC voltage based on the charge status. The actual power output may also be construed as an electrical power supplied to the SR motor 206. The controller 216 may estimate the actual power output by multiplying the converted DC current and the DC voltage. The controller 216 may also store inverter efficiency in the associated memory. In some embodiments, the controller 216 may also take into account the inverter efficiency while estimating the actual power output of the SR motor 206. For example, the controller 216 may use the inverter efficiency while converting the AC current to the DC current. Further, the controller 216 may estimate the actual power output by multiplying the converted DC current, the DC voltage and the SR motor efficiency. The controller 216 may estimate the actual power output by multiplying the reconstructed DC current, the DC voltage, and the inverter efficiency.

After estimating the actual power output, the controller 216 receives the rotational speed of the SR motor 206 from the speed estimation module 214. In some embodiments, the controller 216 may receive signals indicative of the rotational speed of the SR motor 206 through the speed sensor. The controller 216 estimates an actual torque output of the SR motor 206 based on the actual power output and the rotational speed. The controller 216 may determine the actual torque output by dividing the actual power output by the rotational speed of the SR motor 206. In some embodiments, the controller 216 may store in the associated memory, the SR motor efficiency. The controller 216 may also take into account the SR motor efficiency while estimating the actual torque output. For example, the controller 216 may estimate the actual torque output by multiplying the actual power output and the SR motor efficiency to obtain a value, and then dividing the value by the rotational speed of the SR motor 206.

Further, the controller 216 is also in communication with the user interface. The controller 216 may receive signals indicative of the desired torque output specified/identified by the operator using the user interface. The controller 216 then compares the actual torque output with the desired torque output. The controller 216 may calculate a torque error based on the comparison of the actual torque output and the desired torque output. The controller 216 adjusts the torque output limits of the SR motor 206 based on the torque error. The controller 216 adjusts the torque output limits such that the torque output error may be minimized, and the SR motor 206 is operated in appropriate torque ranges as per the needs of the application requirements. Further, the controller 216 may adjust the torque output of the SR motor 206 based on the adjusted torque output limits. The controller 216 may adjust the torque output such that the SR motor 206 is operated in an operating condition in which the torque output of the SR motor 206 is as close as possible to the desired torque output as specified by the operator. In some embodiments, the controller 216 adjusts the rotational speed of the SR motor 206 based on the adjusted torque output limits.

The controller 216 may adjust the torque output of the SR motor 206 and/or the rotational speed of the SR motor 206 so as to minimize the torque error and operate the switched reluctance drive to generate the actual torque output as close to the desired torque output as possible. The controller 216 may use any conventional means of feedback control to minimize the torque error such as Proportional-Integral-Derivative (PID) control, Proportional-Integral (PI) s control etc. The present disclosure in any manner is not limited to the means of feedback control to minimize the torque error.

INDUSTRIAL APPLICABILITY

The present disclosure provides an improved method 300 to control the SR motor 206 of the switched reluctance drive for the machine 100. The method 300 at step 302 includes converting the DC current by the controller 216. The controller 216 converts the DC current based on the AC current supplied by the inverter 204 to the SR motor 206. The controller 216 may use any of the methods and/or algorithms already known in the art to convert the DC current based on the AC current.

The method 300 at step 304 estimates the actual power output generated by the SR motor 206. The controller 216 estimates the actual power output based on the converted DC current and the DC voltage supplied by the DC power source 202 to the inverter 204. The controller 216 may be communicably coupled with the DC power source 202, and may determine the DC voltage based on a charge status of the DC power source 202. In some embodiments, the controller 216 may receive the signals indicative of the DC voltage from the voltage sensor 210 coupled to the DC power source 202. The controller 216 may estimate the actual power output by multiplying the converted DC current and the DC voltage supplied by the DC power source 202 to the inverter 204. In some embodiments, the controller 216 may also take into account the inverter efficiency, and the SR motor efficiency while estimating the actual power output. The controller 216 may use the inverter efficiency while converting the AC current to the DC current. Further, the controller 216 may estimate the actual power output by multiplying the converted DC current, the DC voltage and the SR motor efficiency.

The method 300 at step 306 determines the rotational speed of the SR motor 206. For example, the controller 216 receives the rotational speed of the SR motor 206 through the speed estimation module 214. In some embodiments, the controller 216 may receive the signals indicative of the rotational speed of the SR motor 206 from the speed sensor. The method 300 at step 308 includes estimating the actual torque output. The controller 216 determines the actual torque output based on the actual power output and the rotational speed of the SR motor 206. In some embodiments, the controller 216 determines the actual torque output by dividing the actual power output by the rotational speed of the SR motor 206. In some embodiments, the controller 216 may also take into account the SR motor efficiency while estimating the actual torque output.

The method 300 at step 310 includes receiving the signals indicative of the desired torque output from the user interface. The controller 216 receives the signals generated by the user interface indicative of the desired torque output. In some embodiments, the user interface may be the accelerator pedal, the digital interface, or the joystick. The method 300 at step 312 includes comparing the actual torque output and the desired torque output. The controller 216 compares the actual torque output and the desired torque output to calculate the torque error. The controller 216 may include required means for comparison of the actual torque output and the desired torque output and subsequent calculation of the torque error.

The method 300 at step 314 includes adjusting the torque output limit. The torque output limits may depend on various factors such as, but not limited to, operational condition of the SR motor 206, characteristic properties of the SR motor 206, an application area such as excavation, or trenching etc. for which the machine 100 is being used, machine specifications, SR motor efficiency, and operational characteristics of other components of the switched reluctance drive etc. The controller 216 adjusts the torque output limit based on the calculated torque error, and subsequently controls the SR motor 206 based on the adjusted torque limits. The method 300 at step 316 adjusts the rotational speed of the SR motor 206 based on the adjusted torque output limit. The controller 216 adjusts the rotational speed of the SR motor 206 based on the adjusted torque output limit.

The present disclosure provides an improved method of controlling the SR motor 206 by taking into account the DC-link voltage while providing an algorithm for controlling torque output as well as speed of the SR motor 206. As the varying DC-link voltage no longer is a concern, there is no need to have an additional axis in control algorithms for the DC-link voltage values. Also, the present disclosure allows the controller 216 to determine the required torque output in order to achieve and maintain target speed of the SR motor 206 as per application requirements. Accuracy of the torque output is accounted for by adjusting the torque output range according to the required speed of the SR motor 206. Further, the accuracy of the torque output is maintained regardless of an initial position error and/or torque command errors due to variable or high DC-link voltage.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

What is claimed is:

1. A control system for a switched reluctance (SR) motor, the control system comprising:
   a Direct Current (DC) power source;
   an inverter coupled to the DC power source towards an input side of the inverter, and coupled to the SR motor towards an output side of the inverter, wherein the inverter is configured to receive DC voltage from the DC power source and supply Alternating Current (AC) to the SR motor;
   a user interface configured to enable an operator to specify a desired torque output, and generate signals indicative of the desired torque output;
   a controller communicably coupled to the SR motor, DC power source, the inverter, and the user interface, wherein the controller is configured to:
      convert a DC current from the AC current supplied to the SR motor by the inverter;
      estimate an actual power output generated by the SR motor based at least on the DC voltage and the converted DC current;
      determine a rotational speed of the SR motor;
      estimate an actual torque output based on the actual power output and the rotational speed of the SR motor;
      receive the signals indicative of the desired torque output from the user interface;
      compare the actual torque output and the desired torque output to calculate a torque error;
      adjust a torque output limit based on the calculated torque error; and
      adjust the rotational speed of the SR motor based on the adjusted torque output limit.

2. The control system of claim 1, wherein the controller estimates the actual power output based on an inverter efficiency, a SR motor efficiency, the DC voltage, and the DC current.

3. The control system of claim 1, wherein the controller calculates the output torque error by calculating a difference between the actual torque output and the desired torque output.

4. The control system of claim 1, wherein the controller estimates the actual power output by multiplying the DC voltage and the DC current.

5. The control system of claim 1, wherein the controller estimates the actual torque output by dividing the actual power output by the rotational speed of the SR motor.

6. The control system of claim 1, wherein the controller determines the rotational speed of the SR motor through at least one of a speed sensor or a speed estimation module.

7. A switched reluctance drive comprising:
   a switched reluctance (SR) motor having a stator, and a rotor configured to rotate inside the stator;
   a DC power source;
   an inverter coupled to the DC power source towards an input side of the inverter, and coupled to the SR motor towards an output side of the inverter, wherein the inverter is configured to receive DC voltage from the DC power source and supply AC current to the SR motor;
   a user interface configured to enable an operator to request a desired torque output, and generate signals indicative of the desired torque output;
   a controller communicably coupled to the SR motor, the DC power source, the inverter, and the user interface, wherein the controller is configured to:
      reconstruct a DC current from the AC current supplied to the SR motor by the inverter;
      estimate an actual power output generated by the SR motor based at least on the DC voltage and the reconstructed DC current;
      determine a rotational speed of the SR motor;
      estimate an actual torque output based on the actual power output and the rotational speed of the SR motor;
      receive the signals indicative of the desired torque output from the user interface;
      compare the actual torque output and the desired torque output to calculate a torque error;
      adjust a torque output limit based on the calculated torque error; and
      adjust the actual torque output of the SR motor based on the adjusted torque output limit.

8. The switched reluctance drive of claim 7, wherein the controller estimates the actual power output based on an inverter efficiency, a SR motor efficiency, the DC voltage and the DC current.

9. The switched reluctance drive of claim 7, wherein the controller calculates the output torque error by calculating a difference between the actual torque output and the desired torque output.

10. The switched reluctance drive of claim 7, wherein the controller estimates the actual power output by multiplying the DC voltage and the DC current.

11. The switched reluctance drive of claim 7, wherein the controller estimates the actual torque output by dividing the actual power output by the rotational speed of the SR motor.

12. The switched reluctance drive of claim 7, wherein the controller determines the rotational speed of the SR motor through at least one of a speed sensor or a speed estimation module.

13. A method of controlling a switched reluctance (SR) motor, the method comprising:
   converting, by a controller, a Direct Current (DC) from an Alternating Current (AC), wherein the AC current is supplied to the SR motor by an inverter;
   estimating, by the controller, an actual power output generated by the SR motor based at least on the converted DC current and a DC voltage, wherein the DC voltage is supplied to the inverter by a DC power source;
   determining, by the controller, a rotational speed of the SR motor;
   estimating, by the controller, an actual torque output based on the actual power output and the rotational speed of the SR motor;
   receiving, by the controller, signals indicative of a desired torque output from a user interface;
   comparing, by the controller, the actual torque output and the desired torque output to calculate a torque error;
   adjusting, by the controller, a torque output limit based on the calculated torque error;
   adjusting, by the controller, the rotational speed of the SR motor based on the adjusted torque output limit; and
   the rotational speed of the SR motor being adjusted to minimize the calculated torque error.

14. The method of claim 13, wherein the controller determines the rotational speed of the SR motor through at least one of a speed sensor or a speed estimation module.

15. The method of claim 13, wherein the controller estimates the actual power output based on an inverter efficiency, a SR motor efficiency, and with the DC voltage and the DC current.

16. The method of claim 15, wherein the controller calculates the output torque error by calculating a difference between the actual torque output and the desired torque output.

17. The method of claim 13, wherein the controller estimates the actual power output by multiplying the DC voltage and the DC current.

18. The method of claim 13, wherein the controller estimates the actual torque output by dividing the actual power output by the speed of the SR motor.

19. The method of claim 13, wherein the rotational speed of the SR motor is adjusted to minimize the calculated torque error.

20. The method of claim 13, wherein the torque output limit is based on characteristic properties of the SR motor.

* * * * *